United States Patent
Nakayama

[11] Patent Number: 5,136,559
[45] Date of Patent: Aug. 4, 1992

[54] OPTICAL INFORMATION RECORDING AND REPRODUCING APPARATUS USING TRACKING MIRROR

[75] Inventor: Masahiko Nakayama, Yokohama, Japan

[73] Assignee: Ricoh Company, Ltd., Tokyo, Japan

[21] Appl. No.: 491,173

[22] Filed: Mar. 9, 1990

[30] Foreign Application Priority Data

Mar. 30, 1989 [JP] Japan .................. 1-36858[U]

[51] Int. Cl.⁵ .............................................. G11B 7/00
[52] U.S. Cl. ...................................... 369/32; 369/44.15; 369/44.32; 369/119; 360/78.05
[58] Field of Search ....................... 369/44.15–44.21, 369/32, 112, 119, 118, 120, 44.11, 53, 54, 44.25, 44.32, 44.29; 360/78.05, 78.01, 78.12

[56] References Cited

U.S. PATENT DOCUMENTS

| | | | |
|---|---|---|---|
| 4,607,358 | 8/1986 | Maeda et al. | 369/32 |
| 4,736,353 | 4/1988 | Kasai et al. | 360/78.05 |
| 4,744,071 | 5/1988 | Bricot et al. | 369/44.15 |
| 4,782,474 | 11/1988 | Arai et al. | 369/44.34 |
| 4,815,059 | 3/1989 | Nakayama et al. | 369/45 |
| 5,010,537 | 4/1991 | Ohkuma et al. | 369/54 |

FOREIGN PATENT DOCUMENTS 0079943 3/1989 Japan .................. 369/112

*Primary Examiner*—Roy N. Envall, Jr.
*Assistant Examiner*—Thang V. Tran
*Attorney, Agent, or Firm*—Cooper & Dunham

[57] ABSTRACT

In an apparatus for recording and reproducing optical information, a light beam from a semiconductor laser is reflected by a rotatable tracking mirror and is converged by an objective lens disposed on a carriage to form a small light spot on an optical information recording medium so as to perform recording, reproducing and erasing operations of the information. This apparatus includes a position sensor mechanism disposed near the tracking mirror and detecting a rotary position of the tracking mirror; a carriage control mechanism disposed near the tracking mirror and controlling the movement of the carriage based on an output signal from the position sensor mechanism so as to correct an incident angle of the light beam incident to the objective lens; a light source disposed in the position sensor mechanism and fixed to a rear face side of the tracking mirror with respect to a reflecting face thereof such that the light source is rotated integrally with the tracking mirror; and a light-receiving element disposed in the position sensor mechanism and outputting a signal indicative of a rotary angle of the tracking mirror to the carriage control mechanism by receiving light emitted from the light source.

7 Claims, 1 Drawing Sheet

OPTICAL INFORMATION RECORDING AND REPRODUCING APPARATUS USING TRACKING MIRROR

BACKGROUND OF THE INVENTION

1. Field of the Invention

The present invention relates to an apparatus for recording and reproducing optical information in which a light beam from a semiconductor laser is irradiated onto an optical information recording medium through a tracking mirror and an objective lens to perform recording, reproducing and erasing operations with respect to the optical information.

2. Description of the Related Art

An appratus for recording and reproducing various kinds of optical information has an optical pickup in a carriage for example. In such an optical pickup, a light beam from a semiconductor laser is transmitted through a coupling lens, a polarizing beam splitter, a λ/4 plate, etc. Thereafter, the light beam is reflected by a reflecting face of a rotatable tracking mirror and is converged by an objective lens and is then irradiated onto an optical information recording medium so as to form a small light spot. The reflected light from the optical information recording medium is again transmitted to the polarizing beam splitter through the objective lens, the tracking mirror and the ¼ plate and is then received by a light-receiving element through a convex lens and a cylindrical lens. When a predetermined detecting signal is transmitted from in the light-receiving element, a tracking error signal is generated from a tracking error signal generating circuit and is supplied to a phase compensating circuit. A driving signal generated from the phase compensating circuit is supplied to a tracking drive motor through a drive circuit for driving the tracking drive motor, thereby adjusting the rotation of the tracking mirror. Another driving signal generated from the phase compensating circuit is supplied to a seek motor through a drive circuit for driving the seek motor so as to move the carriage.

In such an apparatus for recording and reproducing optical information, the rotary angle of the tracking mirror for reflecting and irradiating the reproduced light beam onto the optical information recording medium is adjusted and controlled to accurately scan the light beam for reproduction on a recorded trace. At a recording time, the rotary position of the tracking mirror is detected by a light beam for detection different from the light beam for record and is controlled on the basis of an output detected by this light beam for detection. Such an apparatus is shown in Japanese Utility Model publication (KOKOKU) No. 60-34100.

However, in the above controller for controlling the rotary position of the tracking mirror, the rotary position of the tracking mirror is not adjusted to suitably maintain the diameter of a small light spot irradiated onto the optical information recording medium. For example, the light beam must be incident within a range of angle 0°±40' with respect to the objective lens to form the spot having size 1 μm for example. However, there is a case in which the rotary angle of the tracking mirror exceeds a range of angle 0°±20' by the influence of an operating state of a mechanism for attaching the tracking mirror thereto or various kinds of vibrations. In such a case, the reflected light from the tracking mirror is incident to the objective lens at an incorrect angle so that the size of the small light spot irradiated onto the optical information recording medium exceeds an allowable range thereof and the light spot is incorrectly enlarged and modified.

SUMMARY OF THE INVENTION

It is therefore an object of the present invention to provide an apparatus for recording and reproducing optical information in which the rotary position of a tracking mirror is adjusted to correctly maintain a small light spot irradiated onto an optical information recording medium so as to stably perform recording, reproducing and erasing operations of the optical information with respect to the optical information recording medium.

The above object of the present invention can be achieved by an apparatus for recording and reproducing optical information in which a light beam from a semiconductor laser is reflected by a rotatable tracking mirror and is converged by an objective lens disposed on a carriage to form a small light spot on an optical information recording medium so as to perform recording, reproducing and erasing operations of the information, the apparatus comprising a position sensor mechanism disposed near the tracking mirror and detecting a rotary position of the tracking mirror; a carriage control mechanism disposed near the tracking mirror and controlling the movement of the carriage based on an output signal from the position sensor mechanism so as to correct an incident angle of the light beam incident to the objective lens; a light source disposed in the position sensor mechanism and fixed to a rear face side of the tracking mirror with respect to a reflecting face thereof such that the light source is rotated integrally with the tracking mirror; and a light-receiving element disposed in the position sensor mechanism and outputting a signal indicative of a rotary angle of the tracking mirror to the carriage control mechanism by receiving light emitted from the light source.

In the above optical information recording-reproducing apparatus, a rotary center of the tracking mirror is set in a region opposite to a region for arranging the light-receiving element of the position sensor mechanism with respect to the tracking mirror.

In the above-mentioned apparatus, the light emitted from the light source of the position sensor mechanism additionally disposed near the tracking mirror is received by the light-receiving element in the shape of a spot so that the rotary position of the tracking mirror is detected. The carriage is moved by a predetermined distance by the operation of the carriage control mechanism corresponding to the detected signal of the rotary position of the tracking mirror. Thus, the incident angle of the light incident to the objective lens can be suitably corrected.

Further, the rotary center of the tracking mirror is located away from the reflecting face of the tracking mirror so that it is possible to increase the displacement amount of the spot on the light-receiving element with respect to the rotary angle of the tracking mirror, thereby improving sensitivity in detection.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an apparatus for recording and reproducing optical information in the present invention will next be described in detail with reference to the accompanying drawings.

Figure 1:
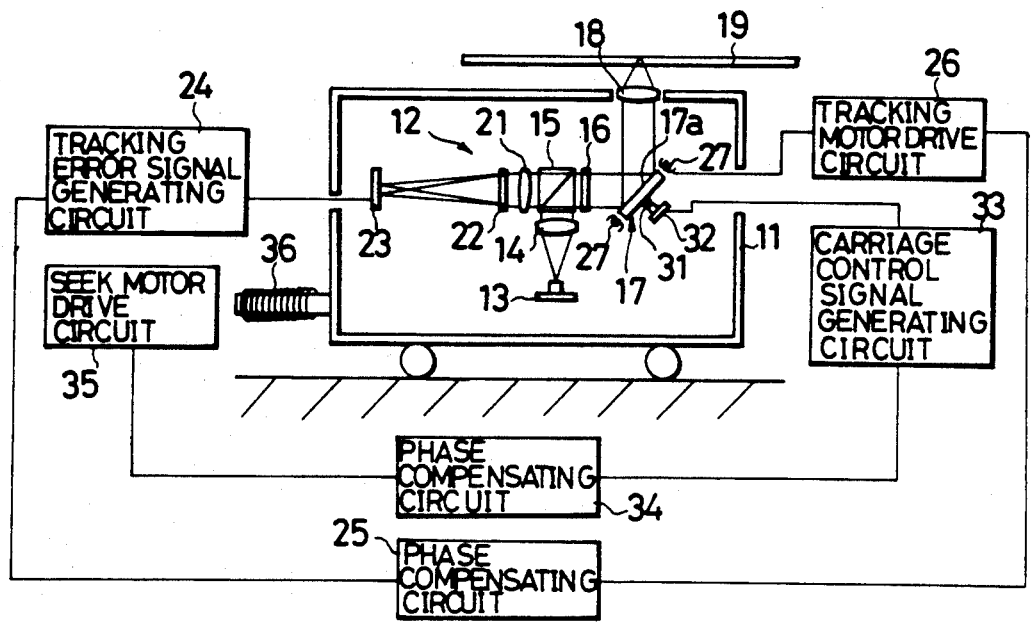
FIG. 1 is a schematic side view showing and explaining an optical pickup in an apparatus for recording and reproducing optical information in an embodiment of the present invention.

As shown in FIG. 1, an optical pickup 12 is disposed in a carriage 11. In the optical pickup 12, a light beam from a semiconductor laser 13 is formed by a coupling lens 14 as a parallel light beam and is reflected by a polarizing beam splitter 15. The reflected light beam is transmitted through a ¼ plate 16 and is reflected by a reflecting face 17a of a rotatable tracking mirror 17. This reflected light beam is then converged by an objective lens 18 and is irradiated onto an optical information recording medium 19 so as to form a small spot. The reflected light from the optical information recording medium 19 is again transmitted to the polarizing beam splitter 15 through the objective lens 18, the reflecting face 17a of the tracking mirror 17 and the λ/4 plate 16 and is then received by a light-receiving element 23 through a convex lens 21 and a cylindrical lens 22.

When a predetermined detecting signal is generated from the light-receiving element 23, a tracking error signal is generated from a tracking error signal generating circuit 24 and is supplied to a phase compensating circuit 25. A driving signal is generated from the phase compensating circuit 25 and is supplied to a tracking drive motor 27 through a drive circuit 26 for driving the tracking drive motor 27, thereby adjusting the rotation of the tracking mirror 17.

A position sensor mechanism is additionally disposed near the above tracking mirror 17 and detects the rotary position of the tracking mirror 17. This position sensor mechanism is constructed by a light source 31 fixed onto a rear face side of the tracking mirror 17 with respect to the reflecting face 17a and a light-receiving element 32 fixed to the carriage 11 so as to receive light emitted from the light source 31. The light source 31 is formed by an LED, etc., and is approximately fixed to a central portion of the tracking mirror 17 on the rear side thereof with respect to the reflecting face 17a. The light-receiving element 32 is constructed by a position detecting element (PSD), two divided light-receiving elements, etc. The light-receiving element 32 is arranged such that a light-receiving face of the light-receiving element 32 is spaced by a predetermined distance from the rear face side of the tracking mirror 17 with respect to the reflecting face 17a thereof and is opposite to the light source 31. Further, as especially shown in FIG. 2, a rotary center 0 of the tracking mirror 17 is set to be spaced from the reflecting face 17a of the tracking mirror 17 by a predetermined distance and is located in a region opposite to a region for arranging the light-receiving element 32 of the position sensor mechanism with respect to the tracking mirror 17. The light-receiving element 32 is disposed in a position separated from the rotary center 0 of the tracking mirror 17 by a distance l.

In FIG. 1, a carriage control mechanism is additionally disposed in relation to the above position sensor mechanism and controls the movement of the carriage 11 so as to correct an incident angle of the light incident to the objective lens 18. A carriage control signal generating circuit 33 is disposed in this carriage control mechanism and receives an output signal from the light-receiving element 32 of the position sensor mechanism. When a predetermined detecting signal is generated from the light-receiving element 32, the carriage control signal generating circuit 33 generates a rotary angular signal having a voltage value proportional to the rotary angel of the tracking mirror 17. This rotary angular signal is supplied to a phase compensating circuit 34 as a carriage movement signal. A driving signal is generated from the phase compensating circuit 34 and is supplied to a seek motor 36 through a seek motor drive circuit 35. The carriage 11 is moved in accordance with this driving signal.

The operation of the tracking mirror 17 is controlled such that the rotary angle of the tracking mirror 17 does not exceed a predetemined range thereof by the control of the movement of the carriage 11. For example, when the tracking mirror 17 is inclined from a certain reference angle to a predetermined angle, the light beam incident to the objective lens 18 is inclined twice this inclination angel. To set the inclination of the light beam incident to the objective lens 18° to 0° without changing the position of the spot on the optical information recording medium 19, it is sufficient to move the carriage 11 by distance f × sin θ when the focal distance of the objective lens 18 is f.

Figure 2:
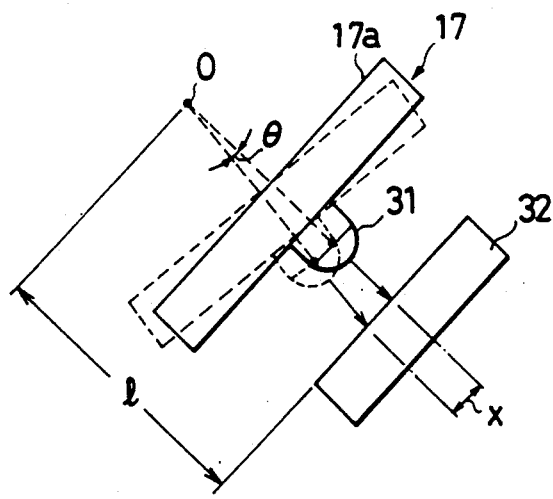
FIG. 2 is a schematic side view for enlarging and explaining a portion of the optical pickup shown in FIG. 1.

The principle for detecting the rotary angle of the tracking mirror 17 will next be described with reference to FIG. 2. When the tracking mirror 17 is rotated by angle θ around the rotary center O, a displacement amount x of the spot irradiated onto the light-receiving face of the light-receiving element 32 is represented by the following formula, $$x = l \tan \theta$$

where the distance from the rotary center O to the light-receiving element 32 is l.

when the rotary angle θ is small, the displacement amount x is proportional to the angle θ and therefore it is possible to know the rotary angle θ if the displacement amount x is detected on the basis of the output signal from the light-receiving element 32. Since the displacement amount x is proportional to the roatry angle θ, it is possible to increase the displacement amount x if the rotary center O of the tracking mirror 17 is separated from the reflecting face 17a to increase the distance l, thereby improving sensitivity in detection. Further, the distance between the light source 31 and the light-receiving element 32 does not directly relate to the displacement amount x so that it is possible to independently reduce this distance and the position sensor mechanism can be thereby made compact.

In the apparatus in the above embodiment, the detecting light is irradiated from the light source 31 of the position sensor mechanism additionally disposed near the tracking mirror 17 and is received by the light-receiving element 32 so that the rotary position of the tracking mirror 17 is detected. Then, the carriage 11 is moved by a predetermined distance by the operation of the carriage control mechanism corresponding to the rotary position of the tracking mirror 17, thereby correcting and maintaining the incident angle of the light incident to the onjective lens 18 in a suitable angular state. For example, to suitably form the spot having size 1 μm, the position of the carriage 11 is adjusted such that the light beam is incident to the objective lens 18 within the range of angle $0°±40'$.

As mentioned above, in the present invention, the apparatus for recording and reproducing optical information comprises a position sensor mechanism for detecting the rotary position of the tracking mirror and a carriage control mechanism for controlling the movement of the carriage based on the output signal from the position sensor mechanism so as to correct the incident angle of the light incident to the objective lens. Accordingly, it is possible to maintain a small light spot irradiated onto the optical information recording medium such that this light spot has suitable diameter and shape at any time. therefore, information can be stably recorded, reproduced and erased with respect to the optical information recording medium. Further, in particular, the light source of the position sensor mechanism is integrally attached to the tracking mirror so that the length of an optical path can be minimized and the optical pickup can be made compact.

Further, in the present invention, the rotary center of the tracking mirror is set in a region opposite to the region for arranging the light-receiving element of the position sensor mechanism with respect to the tracking mirror so as to locate the rotary center thereof away from the reflecting face of the tracking mirror. Accordingly, it is possible to increase the displacement amount of the spot on the light-receiving element with respect to the rotary angle of the tracking mirror. Therefore, sensitivity in detection can be improved and thereby the operation of the apparatus can be preferably controlled, and it is possible to reduce the distance between the light source and the light-receiving element without having any influence on the sensitivity in detection. As a result, the position sensor mechanism can be made compact and a compact optical pickup can be obtained.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for recording and reproducing optical information in which a light beam from a semiconductor laser is reflected by a rotatable tracking mirror and is converged by an objective lens disposed on a carriage to form a small light spot on an optical information recording medium so as to perform recording, reproducing and erasing operations of the information, said apparatus comprising:
    a position sensor mechanism disposed near the tracking mirror and detecting a rotary position of the tracking mirror;
    a carriage control mechanism disposed near the tracking mirror and controlling the movement of the carriage based on an output signal from said position sensor mechanism so as to correct an incident angle of the light beam incident to the objective lens;
    a light source disposed in said position sensor mechanism and fixed to a rear face side of the tracking mirror with respect to a reflecting face thereof such that the light source is rotated integrally with the tracking mirror; and
    a light-receiving element disposed in said position sensor mechanism and outputting a signal indicative of a rotary angle of the tracking mirror to the carriage control mechanism by receiving light emitted from said light source.

2. An optical information recording-reproducing apparatus as claimed in claim 1, wherein a rotary center of the tracking mirror is set in a region opposite to a region for arranging the light-receiving element of the position sensor mechanism with respect to the tracking mirror.

3. An optical information recording-reproducing apparatus as claimed in claim 1, wherein the carriage is moved by a predetermined distance by the operation of the carriage control mechanism corresponding to the detected signal of the rotary position of the tracking mirror.

4. An optical information recording-reproducing apparatus as claimed in claim 1, wherein the light source of the position sensor mechanism is integrally attached to the tracking mirror.

5. An apparatus for recording and reproducing optical information in which a light beam from a semiconductor laser is reflected by a rotatable tracking mirror and is converged by an objective lens disposed on a carriage to form a small light spot on an optical informtion recording medium so as to perform recording, reproducing and erasing operations of the information, said apparatus comprising:
    a position sensor mechanism disposed near the tracking mirror and detecting a rotary position of the tracking mirror;
    a carriage control mechanism disposed near the tracking mirror and controlling the movement of the carriage based on an output signal from said position sensor mechansim so as to correct an incident angle of the light beam incident to the objective lens; and
    a light source disposed in said position sensor mechanism and integrally fixed to a central portion on a rear face side of the tracking mirror with respect to a reflecting face thereof such that the light source is rotated integrally with the tracking mirror;
    a light-receiving element disposed in said position sensor mechanism and outputting a signal indicative of a rotary angle of the tracking mirror to the carriage control mechanism by receiving light emitted from said light source;
    said light source being disposed such that a length of the light beam from said light source to said light-receiving element is minimized when the tracking mirror is inclined by a certain reference angle.

6. An optical information recording-reproducing apparatus as claimed in claim 5, wherein a rotary center of the tracking mirror is set in a region opposite to a region for arranging the light-receiving element of the position sensor mechanism with respect to the tracking mirror.

7. An optical information recording-reproducing apparatus as claimed in claim 5, wherein the carriage is moved by a predetermined distance by the operation of the carriage control mechanism corresponding to the detected signal of the rotary position of the tracking mirror.

* * * * *